(12) United States Patent
Chen

(10) Patent No.: US 11,231,625 B2
(45) Date of Patent: Jan. 25, 2022

(54) LIQUID CRYSTAL PANEL

(71) Applicant: TCL CHINA STAR OPTOELECTRONICS TECHNOLOGY CO., LTD., Guangdong (CN)

(72) Inventor: Zhongtian Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 185 days.

(21) Appl. No.: 16/652,322

(22) PCT Filed: Dec. 20, 2019

(86) PCT No.: PCT/CN2019/127021
§ 371 (c)(1),
(2) Date: Mar. 30, 2020

(87) PCT Pub. No.: WO2021/114375
PCT Pub. Date: Jun. 17, 2021

(65) Prior Publication Data
US 2021/0405468 A1   Dec. 30, 2021

(30) Foreign Application Priority Data

Dec. 12, 2019   (CN) .......................... 201911271051.7

(51) Int. Cl.
*G02F 1/1343* (2006.01)
*G02F 1/1339* (2006.01)
*G02F 1/1337* (2006.01)

(52) U.S. Cl.
CPC ...... *G02F 1/134345* (2021.01); *G02F 1/1337* (2013.01); *G02F 1/13394* (2013.01); *G02F 1/13396* (2021.01)

(58) Field of Classification Search
CPC ............ G02F 1/134345; G02F 1/1337; G02F 1/13394; G02F 1/13396; G02F 1/1343
See application file for complete search history.

(56) References Cited

U.S. PATENT DOCUMENTS

| | | | |
|---|---|---|---|
| 2011/0181822 A1* | 7/2011 | Yamada | G02F 1/133734 349/123 |
| 2011/0234960 A1* | 9/2011 | Nishida | G02F 1/1368 349/139 |
| 2019/0219848 A1* | 7/2019 | Aoki | G02F 1/13363 |
| 2019/0293974 A1* | 9/2019 | Chen | G02F 1/133536 |

* cited by examiner

*Primary Examiner* — Jia X Pan

(57) ABSTRACT

A liquid crystal panel includes a first substrate, a second substrate, and a liquid crystal layer. A first electrode layer and a first alignment film are disposed on a side of the first substrate facing the second substrate. A second electrode layer and a second alignment film are disposed on a side of the second substrate facing the first substrate. At least one auxiliary electrode layer is disposed between the first alignment film and the second alignment film, and the auxiliary electrode layer is disposed in the liquid crystal layer close to the first alignment film and/or the second alignment film.

20 Claims, 4 Drawing Sheets

LIQUID CRYSTAL PANEL

The present application claims the priority of Chinese patent application No. 201911271051.7 filed on Dec. 12, 2019 and titled "LIQUID CRYSTAL PANEL", which is herein incorporated by reference in its entirety.

BACKGROUND OF INVENTION

Field of Invention

The present invention relates to the field of display technology, more particularly, to a liquid crystal panel.

Description of Prior Art

Liquid crystal display (LCD) panels are widely used flat-panel displays. The display panels mainly realize the screen display by modulating the intensity of the light field of the backlight source through a liquid crystal switch. The polymer stabilized vertical alignment technology in LCD panels can make liquid crystal display panels have advantages, such as fast response time and high transmittance. The principle is to apply an alignment film (PT) on a pixel electrode and anchor the liquid crystal molecules through the alignment film, so the liquid crystal molecules are aligned vertically, and reactive mesogen (RM) in the liquid crystal forms a polymer protrusion on the surface of the alignment film by ultraviolet (UV) light radiation. Therefore, the liquid crystal molecules have a pretilt angle.

However, because anchoring effect of PT side chains, in, a degree of tilt of a part of the liquid crystal molecules is affected a power-on state, resulting in a certain loss of the transmittance of the panels.

Therefore, it has defects in the prior art and urgently needs to be improved.

SUMMARY OF INVENTION

A liquid crystal panel is provided, it solves the problems that the liquid crystal panels in the prior art affect the degree of tilt of the liquid crystal molecules due to the anchoring effect of the alignment film side chains, and then affects the transmittance of the liquid crystal panels.

In order to solve the above problems, the technical solutions are described as follows:

A liquid crystal panel comprises:
a first substrate and a second substrate opposite to each other;
a liquid crystal layer disposed between the first substrate and the second substrate;
a first electrode layer disposed on a side surface of the first substrate facing the second substrate;
a second electrode layer disposed on a side surface of the second substrate facing the first substrate;
a first alignment film disposed on a side surface of the first electrode layer facing the second substrate; and
a second alignment film disposed on a side surface of the second electrode layer facing the first substrate. At least one auxiliary electrode layer is disposed between the first alignment film and the second alignment film, and the auxiliary electrode layer is disposed in the liquid crystal layer close to the first alignment film and/or the second alignment film, and the auxiliary electrode layer is configured to form an electric field with the first electrode layer and/or the second electrode layer.

In one embodiment, the auxiliary electrode layer is disposed close to the first electrode layer, and electric field intensity formed between the auxiliary electrode layer and the first electrode layer is greater than electric field intensity formed between the auxiliary electrode layer and the second electrode layer.

In one embodiment, the auxiliary electrode layer is disposed close to the second electrode layer, and electric field intensity formed between the auxiliary electrode layer and the second electrode layer is greater than electric field intensity formed between the auxiliary electrode layer and the first electrode layer.

In one embodiment, liquid crystal molecules are disposed between the auxiliary electrode layer and the first alignment film, and between the auxiliary electrode layer and the second alignment film.

In one embodiment, liquid crystal molecules are disposed between the auxiliary electrode layer and the first alignment film, and between the auxiliary electrode layer and the second alignment film.

In one embodiment, the liquid crystal panel comprises two auxiliary electrode layers, a first auxiliary electrode layer is disposed close to the first electrode layer, and a second auxiliary electrode layer is disposed close to the second electrode layer; and wherein electric field intensity formed between the first auxiliary electrode layer and the first electrode layer is equal to electric field intensity formed between the second auxiliary electrode layer and the second electrode layer, which are greater than electric field intensity formed between the first auxiliary electrode layer and the second auxiliary electrode layer.

In one embodiment, liquid crystal molecules are disposed between the first auxiliary electrode layer and the first alignment film, between the second auxiliary electrode layer and the second alignment film, and between the first auxiliary electrode layer and the second auxiliary electrode layer.

In one embodiment, the liquid crystal panel comprises a plurality of sub-pixel units, and the auxiliary electrode layer corresponds to a distribution of a sub-pixel unit array.

In one embodiment, a spacer is disposed on the first substrate and/or the second substrate, the spacer is configured to support the auxiliary electrode layer, and the spacer is correspondingly disposed between two adjacent sub-pixels.

In one embodiment, the auxiliary electrode layer is a hollow or fishbone structure.

A liquid crystal panel comprises:
a first substrate and a second substrate opposite to each other;
a liquid crystal layer disposed between the first substrate and the second substrate;
a first electrode layer disposed on a side surface of the first substrate facing the second substrate;
a second electrode layer disposed on a side surface of the second substrate facing the first substrate;
a first alignment film disposed on a side surface of the first electrode layer facing the second substrate; and
a second alignment film disposed on a side surface of the second electrode layer facing the first substrate. At least one auxiliary electrode layer is disposed between the first alignment film and the second alignment film, and the auxiliary electrode layer is disposed in the liquid crystal layer close to the first alignment film and/or the second alignment film, the auxiliary electrode layer is configured to form an electric field with the first electrode layer and/or the second electrode layer, and the first electrode layer, the second electrode layer, and the auxiliary electrode layer are disposed in parallel with each other, and are all transparent electrodes.

In one embodiment, the auxiliary electrode layer is disposed close to the first electrode layer, and electric field intensity formed between the auxiliary electrode layer and the first electrode layer is greater than electric field intensity formed between the auxiliary electrode layer and the second electrode layer.

In one embodiment, the auxiliary electrode layer is disposed close to the second electrode layer, and electric field intensity formed between the auxiliary electrode layer and the second electrode layer is greater than electric field intensity formed between the auxiliary electrode layer and the first electrode layer.

In one embodiment, liquid crystal molecules are disposed between the auxiliary electrode layer and the first alignment film, and between the auxiliary electrode layer and the second alignment film.

In one embodiment, liquid crystal molecules are disposed between the auxiliary electrode layer and the first alignment film, and between the auxiliary electrode layer and the second alignment film.

In one embodiment, the liquid crystal panel comprises two auxiliary electrode layers, a first auxiliary electrode layer is disposed close to the first electrode layer, and a second auxiliary electrode layer is disposed close to the second electrode layer; and wherein electric field intensity formed between the first auxiliary electrode layer and the first electrode layer is equal to electric field intensity formed between the second auxiliary electrode layer and the second electrode layer, which are greater than electric field intensity formed between the first auxiliary electrode layer and the second auxiliary electrode layer.

In one embodiment, liquid crystal molecules are disposed between the first auxiliary electrode layer and the first alignment film, between the second auxiliary electrode layer and the second alignment film, and between the first auxiliary electrode layer and the second auxiliary electrode layer.

In one embodiment, the liquid crystal panel comprises a plurality of sub-pixel units, and the auxiliary electrode layer corresponds to a distribution of a sub-pixel unit array.

In one embodiment, a spacer is disposed on the first substrate and/or the second substrate, the spacer is configured to support the auxiliary electrode layer, and the spacer is correspondingly disposed between two adjacent sub-pixels.

In one embodiment, the auxiliary electrode layer is a hollow or fishbone structure.

The beneficial effect of the present invention is that a liquid crystal panel provided is provided with at least one auxiliary electrode layer between the first alignment film and the second alignment film, and the auxiliary electrode layer is disposed in the liquid crystal layer close to the first alignment film and/or the second alignment film. The auxiliary electrode layer is configured to form an electric field with the first electrode layer and/or the second electrode layer. The electric field intensity between the auxiliary electrode layer and the first electrode layer and/or the second electrode layer is increased, thereby increasing the degree of tilt of liquid crystal molecules close to a side of the alignment film. Therefore, transmittance of the liquid crystal display panel is improved.

BRIEF DESCRIPTION OF DRAWINGS

The following detailed description of specific embodiments of the present invention makes the technical solutions and beneficial effects to be obvious in conjunction with the accompanying drawings.

DETAILED DESCRIPTION OF PREFERRED EMBODIMENTS

Directional terms mentioned in this application, such as "up," "down," "forward," "backward," "left," "right," "inside," "outside," "side," etc., are merely indicated the direction of the drawings. Therefore, the directional terms are used for illustrating and understanding of the application rather than limiting thereof.

Figure 1:
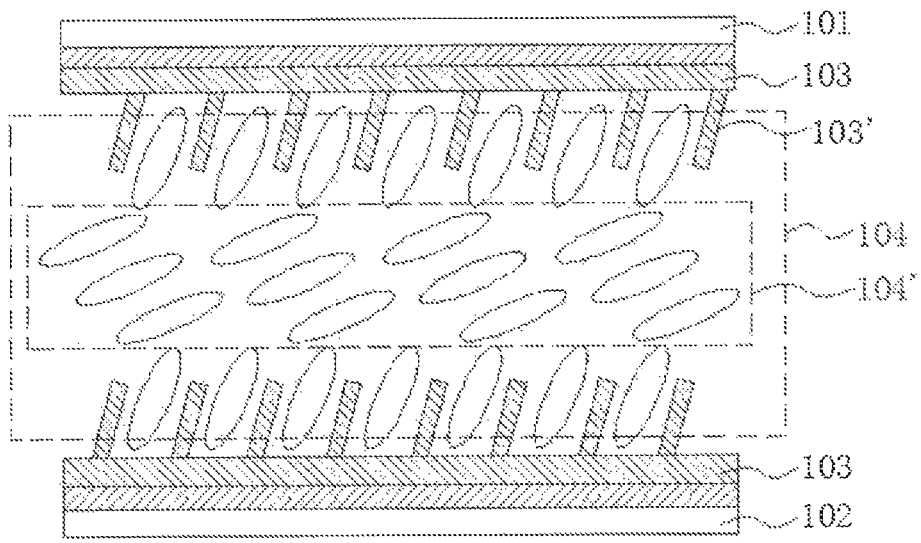
FIG. 1 is a schematic view of liquid crystal molecules deflection of a liquid crystal panel of the prior art when current is applied to a pixel electrode.

FIG. 1 is a schematic view of liquid crystal molecules deflection of a liquid crystal panel of the prior art when current is applied to a pixel electrode.

The liquid crystal panel is usually coated with an alignment film (PI) 103 on a surface of an upper substrate 101 and a surface of a lower substrate 102, which are aligned with each other, and reactive mesogen (RM) in the liquid crystal layer 104 forms a polymer protrusion 103' on a surface of the alignment film 103 by ultraviolet (UV) light radiation, that is, a PI side chain is formed, which can anchor liquid crystal molecules, and thus the liquid crystal molecules are aligned vertically. Therefore, the liquid crystal molecules have a pretilt angle.

When a current is applied to pixel electrodes on the upper substrate 101 and the lower substrate 102, the liquid crystal molecules are deflected under a vertical electric field. Due to the anchoring effect of the PI side chain, the liquid crystal molecules close to the alignment film 103 have a lower degree of tilt than the liquid crystal molecules of the effective layer 104' in the middle of the panel. The liquid crystal molecules are not completely tilted, which results in a certain loss of transmittance.

The following embodiments of the present invention solve the technical problem of the degree of tilt of liquid crystal molecules in the liquid crystal panels is affected due to the anchoring effect of the alignment film side chains, which affects the transmittance of the liquid crystal panels.

Referring to FIG. 2 to FIG. 7, they are schematic views of the liquid crystal panels according to the embodiments of the present invention. The liquid crystal panel comprises a first substrate 201 and a second substrate 202 opposite to each other. A first electrode layer 2010 is disposed on a side surface of the first substrate 201 facing the second substrate 202. A second electrode layer 2020 is disposed on a side surface of the second substrate 202 facing the first substrate 201. A first alignment film 2011 is disposed on a side surface of the first electrode layer 2010 facing the second substrate 202. A second alignment film 2021 is disposed on a side surface of the second electrode layer 2020 facing the first substrate 201. A liquid crystal layer 203 is disposed between the first alignment film 2011 and the second alignment film 2021.

At least one auxiliary electrode layer 204 is disposed between the first alignment film 2011 and the second alignment film 2021, and the auxiliary electrode layer 204 is disposed in the liquid crystal layer 203 close to the first alignment film 2011 and/or the second alignment film 2021, and the auxiliary electrode layer 204 is configured to form an electric field with the first electrode layer 2010 and/or the second electrode layer 2020.

In the embodiment of the present invention, the auxiliary electrode layer 204 is disposed in the liquid crystal layer 203. In order to ensure that the position of the auxiliary electrode layer 204 is fixed and does not shift, a spacer 205 is disposed on the first substrate 201 and/or the second substrate 202. The spacer 205 is configured to support the auxiliary electrode layer 204. The first substrate 201 may be a color filter substrate, and the second substrate 202 may be an array substrate.

The liquid crystal panel comprises a plurality of sub-pixel units (not shown). Both of the first electrode layer 2010 and the second electrode layer 2020 comprise a plurality of electrode units corresponding to the sub-pixel units. The auxiliary electrode layer 204 corresponds to a distribution of a sub-pixel unit array.

In the embodiments of the present invention, in order not to affect the transmittance of the sub-pixel unit, the spacer 205 may be correspondingly disposed at a position between two adjacent sub-pixel units, which is not limited herein.

In the embodiments of the present invention, the first electrode layer 2010, the second electrode layer 2030, and the auxiliary electrode layer 204 are disposed in parallel with each other, and are all transparent electrodes. The transparent electrode material comprises at least one of indium tin oxide (ITO), indium zinc oxide (IZO), zinc oxide (ZnO), indium oxide ($In_2O_3$), indium gallium oxide (IGO), and zinc aluminum oxide (AZO).

In the embodiments of the present invention, the auxiliary electrode layer 204 is a hollow or fishbone structure, which is not limited herein.

In the embodiments of the present invention, the electric field intensity between the auxiliary electrode layer 204 and the first electrode layer 2010 and/or the second electrode layer 2020 is increased, thereby increasing the degree of tilt of liquid crystal molecules close to a side of the alignment film. Therefore, transmittance of the liquid crystal display (LCD) panel is improved.

The liquid crystal panel is described in detail in combination with the following specific embodiments.

Figure 2:
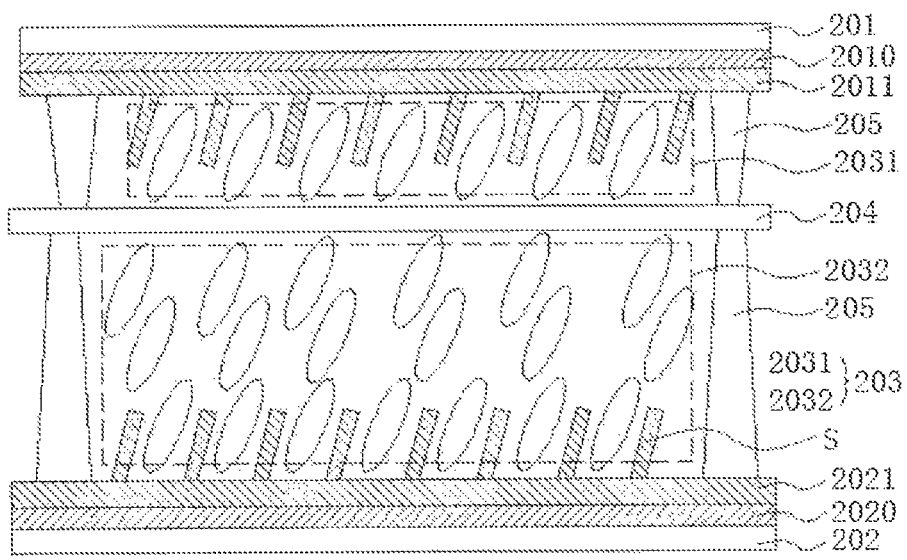
FIG. 2 is a schematic view of a liquid crystal panel according to a first embodiment of the present invention without applied voltages.

In first embodiment, referring to FIG. 2, an auxiliary electrode layer 204 is disposed between the first alignment film 2011 and the second alignment film 2021, and the auxiliary electrode layer 204 is disposed in the liquid crystal layer 203 close to the first electrode layer 2010. The liquid crystal layer 203 is divided by the auxiliary electrode layer 204 into a first liquid crystal sub-layer 2031 disposed between the auxiliary electrode layer 204 and the first alignment film 2011 and a second liquid crystal sub-layer 2032 disposed between the auxiliary electrode layer 204 and the second alignment film 2021. That is, liquid crystal molecules are disposed between the Auxiliary electrode layer 204 and the first alignment film 2011, and between the auxiliary electrode layer 204 and the second alignment film 2021. When no voltage is applied to the first electrode layer 2010 and the second electrode layer 2020, the liquid crystal molecules are arranged vertically by polymer protrusions S on the surfaces of the first alignment film 2011 and the second alignment film 2021 and have a pretilt angle, as shown in FIG. 2.

In the embodiment, a distance between the auxiliary electrode layer 204 and the first alignment film 2011 is about 0.2 μm, but it is not limited herein.

Figure 3:
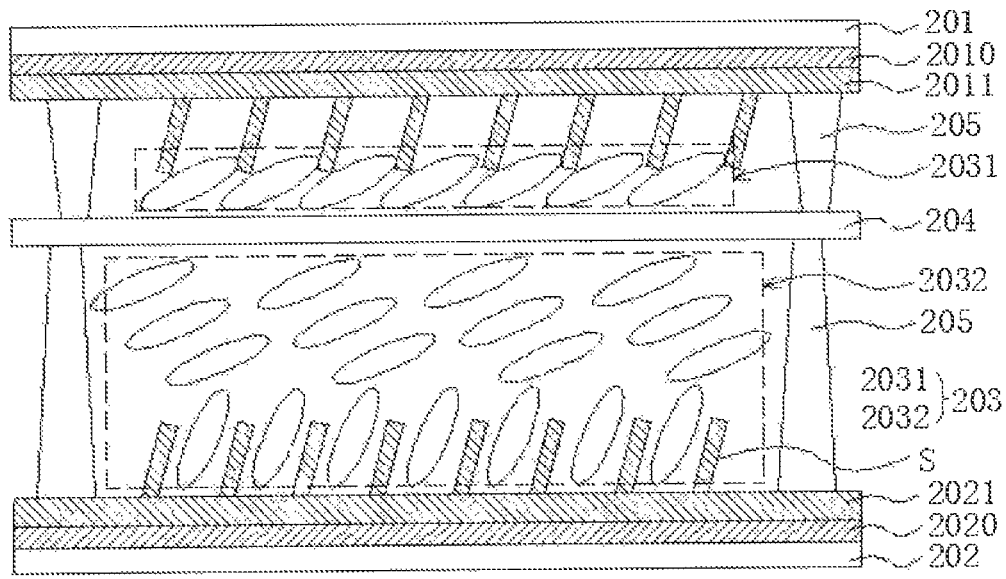
FIG. 3 is a schematic view of the liquid crystal panel according to the first embodiment of the present invention with applied voltages.

Referring to FIG. 3, when a voltage is applied to the first electrode layer 2010 and the second electrode layer 2020, the auxiliary electrode layer 204, the first electrode layer 2010, and the second electrode layer 2020 are configured to form an electric field. In addition, electric field intensity formed between the auxiliary electrode layer 204 and the first electrode layer 2010 is greater than electric field intensity formed between the auxiliary electrode layer 204 and the second electrode layer 2020.

Because the electric field intensity in the first liquid crystal sub-layer 2031 is increased, the degree of tilt of the liquid crystal molecules in the first liquid crystal layer 2031 becomes greater, and the more backlight is allowed to pass through the liquid crystal layer 203, Thus, the transmittance of the liquid crystal display panel is improved.

Preferably, the degree of tilt of the liquid crystal molecules in the first liquid crystal sub-layer 2031 is consistent with the degree of tilt the effective liquid crystal molecules in the middle position of the liquid crystal layer 203. Specifically, the electric field intensity can be controlled by adjusting the distance between the auxiliary electrode layer 204 and the first electrode layer 2010, so as to regulate the degree of tilt the liquid crystal molecules in the first liquid crystal sub-layer 2031. Alternatively, the hollow area of the auxiliary electrode layer 204 is adjusted to control the electric field intensity between the auxiliary electrode layer 204 and the first electrode layer 2010, so as to adjust the degree of tilt of the liquid crystal molecules in the first liquid crystal sub-layer 2031.

Figure 4:
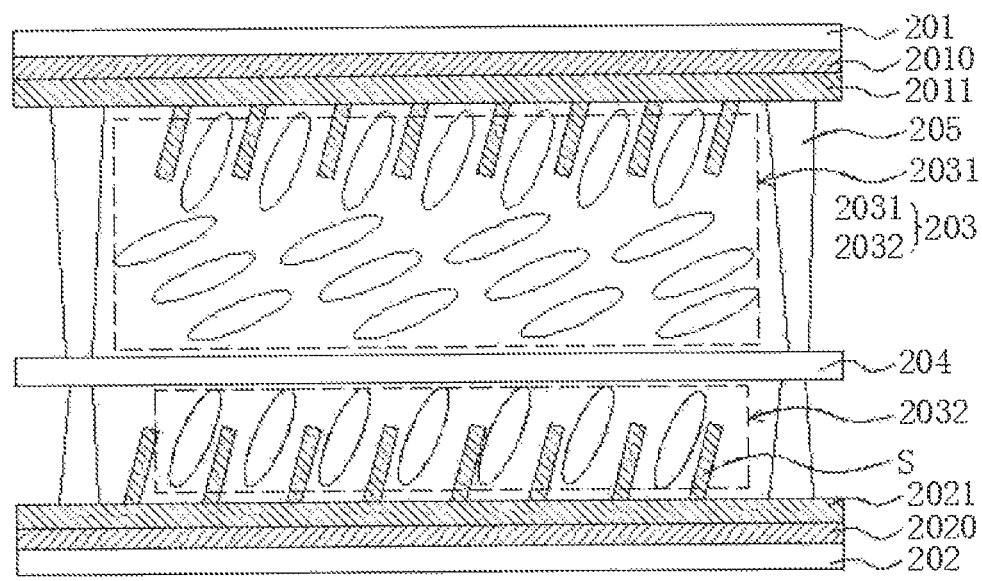
FIG. 4 is a schematic view of a liquid crystal panel according to a second embodiment of the present invention without applied voltages.

In this embodiment, a spacer 205 is disposed on the first substrate 201 and the second substrate 202, and material and shape of the spacer 205 are not limited herein In second embodiment, referring to FIG. 4, the liquid crystal panel is the same and similar to the liquid crystal panel of the first embodiment, and the difference is that the auxiliary electrode layer 204 is disposed one a side of the liquid crystal layer 203 close to the second electrode layer 2020. Side position setting. When no voltage is applied to the first electrode layer 2010 and the second electrode layer 2020, the liquid crystal molecules are arranged vertically by polymer protrusions S on the surfaces of the first alignment film 2011 and the second alignment film 2021 and have a pretilt angle, as shown in FIG. 4.

In this embodiment, a distance between the auxiliary electrode layer 204 and the second alignment film 2021 is about 0.2 μm, but it is not limited herein.

Figure 5:
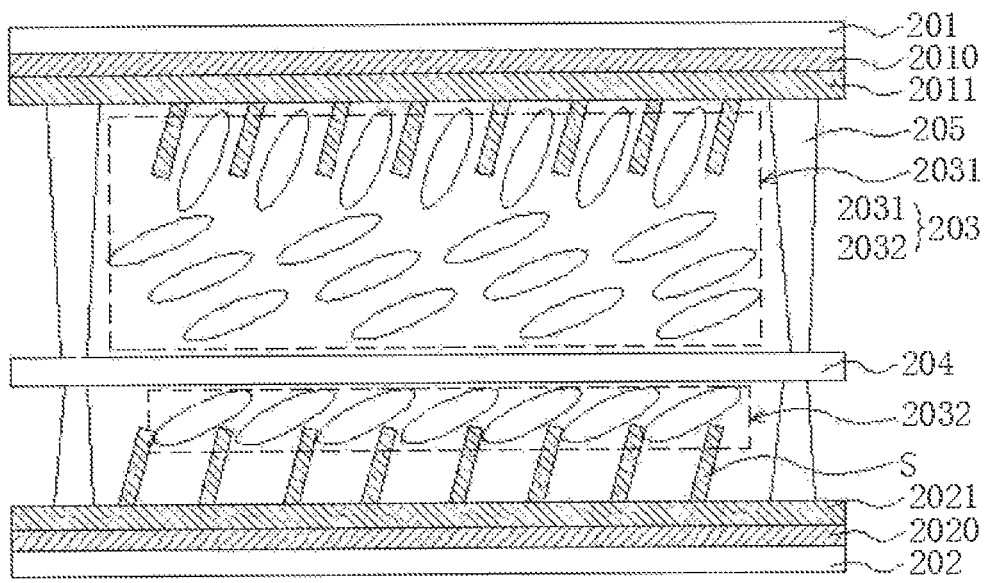
FIG. 5 is a schematic view of a liquid crystal panel according to a second embodiment of the present invention with applied voltages.

Referring to FIG. 5, when a voltage is applied to the first electrode layer 2010 and the second electrode layer 2020, the auxiliary electrode layer 204, the first electrode layer 2010, and the second electrode layer 2020 are configured to form an electric field. In addition, electric field intensity formed between the auxiliary electrode layer 204 and the second electrode layer 2020 is greater than electric field intensity formed between the auxiliary electrode layer 204 and the first electrode layer 2010.

Because the electric field intensity in the second liquid crystal sub-layer 2032 is increased, the degree of tilt of the liquid crystal molecules in the second liquid crystal layer 2032 becomes greater, and the more backlight is allowed to pass through the liquid crystal layer 203, Thus, the transmittance of the liquid crystal display panel is improved.

Preferably, the degree of tilt of the liquid crystal molecules in the second liquid crystal sub-layer 2032 is consistent with the degree of tilt of the effective liquid crystal molecules in the middle position of the liquid crystal layer 203.

Figure 6:
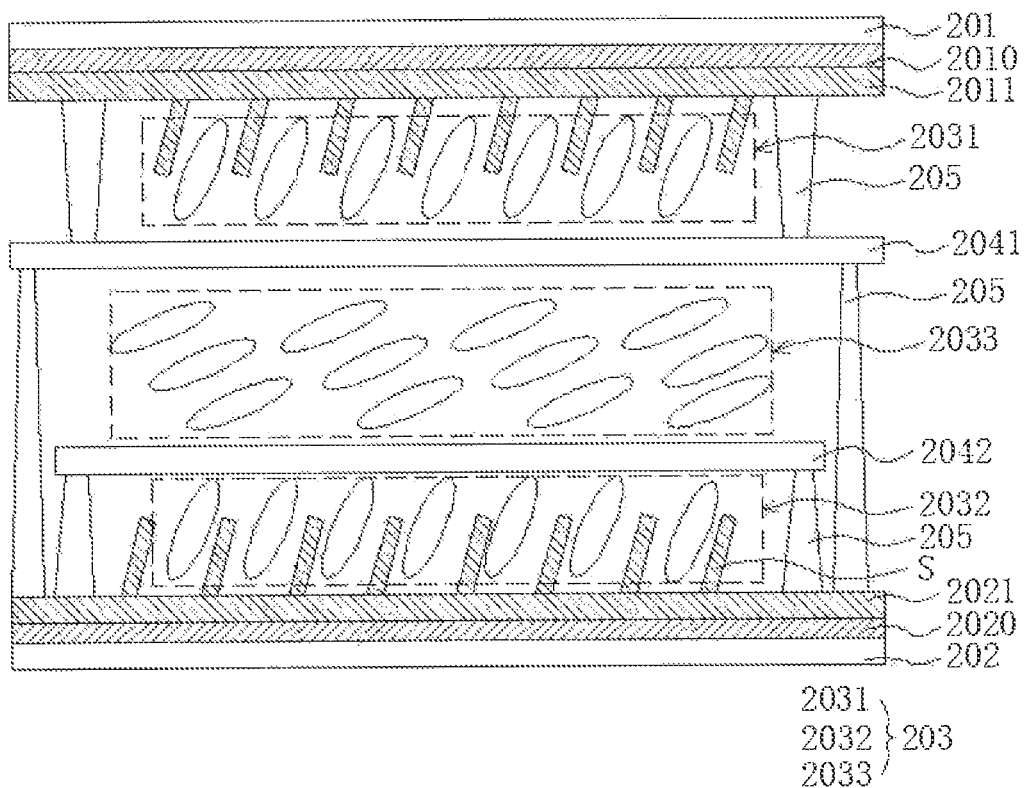
FIG. 6 is a schematic view of a liquid crystal panel according to a third embodiment of the present invention without applied voltages.

In third embodiment, referring to FIG. 6, the liquid crystal panel is the same and similar to the liquid crystal panel of the first embodiment and the second embodiment, and the difference is that The liquid crystal panel comprises two the auxiliary electrode layer. A first auxiliary electrode layer 2041 is disposed on a side of the liquid crystal layer 203 close to the first electrode layer 2010. A second auxiliary electrode layer 2042 is disposed on a side of the liquid crystal layer 203 close to the second electrode layer 2020.

The liquid crystal layer 203 comprises a first liquid crystal sub-layer 2031, second liquid crystal sub-layer 2032, and a third liquid crystal sub-layer 2033. The first liquid crystal sub-layer 2031 is disposed between the first auxiliary electrode layer 2041 and the first alignment film 2011. The second liquid crystal sub-layer 2032 is disposed between the second auxiliary electrode layer 2042 and the second alignment film 2021. The third liquid crystal sub-layer 2033 is disposed between the first auxiliary electrode layer 2041 and the second auxiliary electrode layer 2042.

When no voltage is applied to the first electrode layer 2010 and the second electrode layer 2020, the liquid crystal molecules are arranged vertically by polymer protrusions S on the surfaces of the first alignment film 2011 and the second alignment film 2021 and have a pretilt angle, as shown in FIG. 6.

Figure 7:
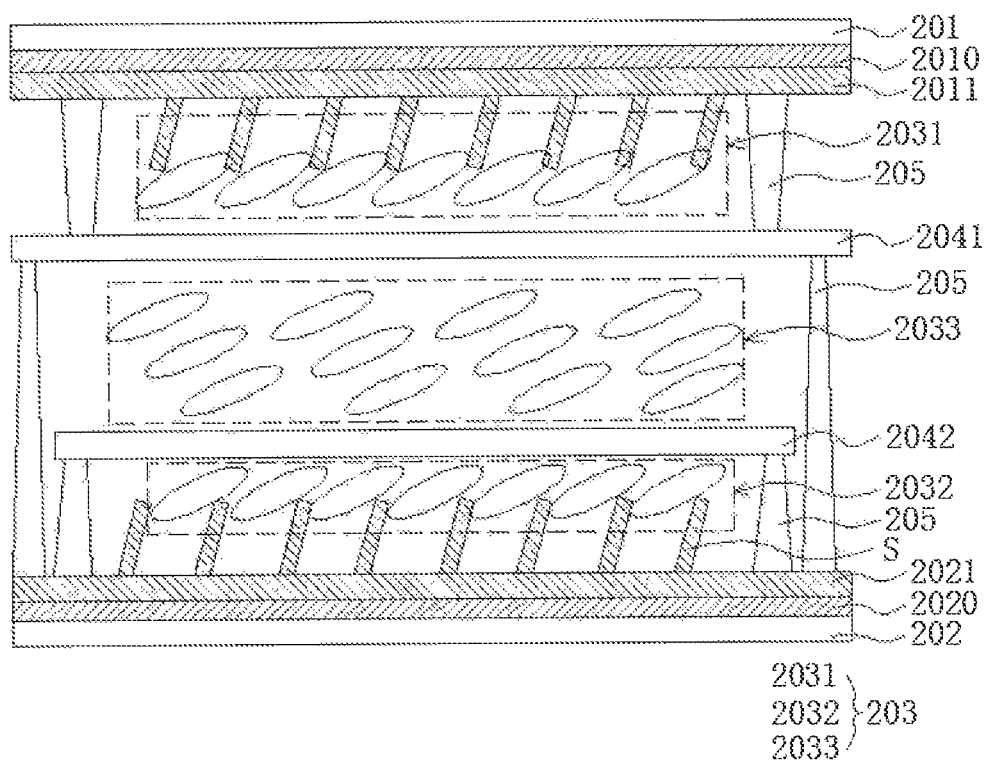
FIG. 7 is a schematic view of a liquid crystal panel according to a third embodiment of the present invention with applied voltages.

Referring to FIG. 7, when a voltage is applied to the first electrode layer 2010 and the second electrode layer 2020, the first auxiliary electrode layer 2041 and the first electrode layer 2010 are configured to form a first electric field, the second auxiliary electrode layer 2042 and the second electrode layer 2020 are configured to form a second electric field, and the first auxiliary electrode layer 2041 and the second auxiliary electrode layer 2042 are configured to form a third electric field. In addition, the first electric field intensity is equal to the second electric field intensity, and both are greater than the third electric field intensity.

Compared with the first embodiment and the second embodiment, the electric field intensity in the first liquid crystal sub-layer 2031 and second liquid crystal sub-layer 2032 is increased in the third embodiment, the degree of tilt of the liquid crystal molecules in the first liquid crystal sub-layer 2031 and the second liquid crystal layer 2032 becomes greater. That is, the influence of the anchoring effect of the alignment film side chains on the degree of tilt of the liquid crystal molecules is greatly eliminated, and the amount of backlight passing through the liquid crystal layer 203 is maximized, thereby further improving the transmittance of the liquid crystal panel.

Preferably, the degree of tilt of the liquid crystal molecules in the first liquid crystal sub-layer 2031 and the second liquid crystal sub-layer 2032 is consistent with the degree of tilt of the effective liquid crystal molecules in the third liquid crystal sub-layer 2033 in the middle position of the liquid crystal layer 203.

In the embodiments of the present invention, an auxiliary electrode layer is disposed between the first alignment film and the second alignment film, and the auxiliary electrode layer is disposed in the liquid crystal layer close to the first alignment film and/or the second alignment film. The auxiliary electrode layer is configured to form an electric field with the first electrode layer and/or the second electrode layer. The present application increases the electric field strength between the auxiliary electrode layer and the first electrode layer and/or the second electrode layer, thereby increasing the degree of pouring of liquid crystal molecules near the alignment film side, thereby improving the transmittance of the liquid crystal panel. In the embodiments of the present invention, the electric field intensity between the auxiliary electrode layer and the first electrode layer and/or the second electrode layer is increased, thereby increasing the degree of tilt of liquid crystal molecules close to a side of the alignment film. Therefore, transmittance of the liquid crystal display panel is improved.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A liquid crystal panel, comprising:
   a first substrate and a second substrate opposite to each other;
   a liquid crystal layer disposed between the first substrate and the second substrate;
   a first electrode layer disposed on a side surface of the first substrate facing the second substrate;
   a second electrode layer disposed on a side surface of the second substrate facing the first substrate;
   a first alignment film disposed on a side surface of the first electrode layer facing the second substrate; and
   a second alignment film disposed on a side surface of the second electrode layer facing the first substrate;
   wherein at least one auxiliary electrode layer is disposed between the first alignment film and the second alignment film, and the auxiliary electrode layer is disposed in the liquid crystal layer close to the first alignment film and/or the second alignment film, and the auxiliary electrode layer is configured to form an electric field with the first electrode layer and/or the second electrode layer.

2. The liquid crystal panel according to claim 1, wherein the auxiliary electrode layer is disposed close to the first electrode layer, and electric field intensity formed between the auxiliary electrode layer and the first electrode layer is greater than electric field intensity formed between the auxiliary electrode layer and the second electrode layer.

3. The liquid crystal panel according to claim 1, wherein the auxiliary electrode layer is disposed close to the second electrode layer, and electric field intensity formed between the auxiliary electrode layer and the second electrode layer is greater than electric field intensity formed between the auxiliary electrode layer and the first electrode layer.

4. The liquid crystal panel according to claim 2, wherein liquid crystal molecules are disposed between the auxiliary electrode layer and the first alignment film, and between the auxiliary electrode layer and the second alignment film.

5. The liquid crystal panel according to claim 3, wherein liquid crystal molecules are disposed between the auxiliary electrode layer and the first alignment film, and between the auxiliary electrode layer and the second alignment film.

6. The liquid crystal panel according to claim 1, wherein the liquid crystal panel comprises two auxiliary electrode layers, a first auxiliary electrode layer is disposed close to the first electrode layer, and a second auxiliary electrode layer is disposed close to the second electrode layer; and wherein electric field intensity formed between the first auxiliary electrode layer and the first electrode layer is equal to electric field intensity formed between the second auxiliary electrode layer and the second electrode layer, which are greater than electric field intensity formed between the first auxiliary electrode layer and the second auxiliary electrode layer.

7. The liquid crystal panel according to claim 6, wherein liquid crystal molecules are disposed between the first auxiliary electrode layer and the first alignment film, between the second auxiliary electrode layer and the second alignment film, and between the first auxiliary electrode layer and the second auxiliary electrode layer.

8. The liquid crystal panel according to claim 1, wherein the liquid crystal panel comprises a plurality of sub-pixel units, and the auxiliary electrode layer corresponds to a distribution of a sub-pixel unit array.

9. The liquid crystal panel according to claim 8, wherein a spacer is disposed on the first substrate and/or the second substrate, the spacer is configured to support the auxiliary electrode layer, and the spacer is correspondingly disposed between two adjacent sub-pixels.

10. The liquid crystal panel according to claim 1, wherein the auxiliary electrode layer is a hollow or fishbone structure.

11. A liquid crystal panel, comprising:
a first substrate and a second substrate opposite to each other;
a liquid crystal layer disposed between the first substrate and the second substrate;
a first electrode layer disposed on a side surface of the first substrate facing the second substrate;
a second electrode layer disposed on a side surface of the second substrate facing the first substrate;
a first alignment film disposed on a side surface of the first electrode layer facing the second substrate; and
a second alignment film disposed on a side surface of the second electrode layer facing the first substrate;
wherein at least one auxiliary electrode layer is disposed between the first alignment film and the second alignment film, and the auxiliary electrode layer is disposed in the liquid crystal layer close to the first alignment film and/or the second alignment film, the auxiliary electrode layer is configured to form an electric field with the first electrode layer and/or the second electrode layer, and the first electrode layer, the second electrode layer, and the auxiliary electrode layer are disposed in parallel with each other, and are all transparent electrodes.

12. The liquid crystal panel according to claim 11, wherein the auxiliary electrode layer is disposed close to the first electrode layer, and electric field intensity formed between the auxiliary electrode layer and the first electrode layer is greater than electric field intensity formed between the auxiliary electrode layer and the second electrode layer.

13. The liquid crystal panel according to claim 11, wherein the auxiliary electrode layer is disposed close to the second electrode layer, and electric field intensity formed between the auxiliary electrode layer and the second electrode layer is greater than electric field intensity formed between the auxiliary electrode layer and the first electrode layer.

14. The liquid crystal panel according to claim 12, wherein liquid crystal molecules are disposed between the auxiliary electrode layer and the first alignment film, and between the auxiliary electrode layer and the second alignment film.

15. The liquid crystal panel according to claim 13, wherein liquid crystal molecules are disposed between the auxiliary electrode layer and the first alignment film, and between the auxiliary electrode layer and the second alignment film.

16. The liquid crystal panel according to claim 11, wherein the liquid crystal panel comprises two auxiliary electrode layers, a first auxiliary electrode layer is disposed close to the first electrode layer, and a second auxiliary electrode layer is disposed close to the second electrode layer; and wherein electric field intensity formed between the first auxiliary electrode layer and the first electrode layer is equal to electric field intensity formed between the second auxiliary electrode layer and the second electrode layer, which are greater than electric field intensity formed between the first auxiliary electrode layer and the second auxiliary electrode layer.

17. The liquid crystal panel according to claim 16, wherein liquid crystal molecules are disposed between the first auxiliary electrode layer and the first alignment film, between the second auxiliary electrode layer and the second alignment film, and between the first auxiliary electrode layer and the second auxiliary electrode layer.

18. The liquid crystal panel according to claim 11, wherein the liquid crystal panel comprises a plurality of sub-pixel units, and the auxiliary electrode layer corresponds to a distribution of a sub-pixel unit array.

19. The liquid crystal panel according to claim 18, wherein a spacer is disposed on the first substrate and/or the second substrate, the spacer is configured to support the auxiliary electrode layer, and the spacer is correspondingly disposed between two adjacent sub-pixels.

20. The liquid crystal panel according to claim 11, wherein the auxiliary electrode layer is a hollow or fishbone structure.

* * * * *